United States Patent [19]
Blakeley

[11] Patent Number: 4,761,536
[45] Date of Patent: Aug. 2, 1988

[54] METHOD AND APPARATUS FOR REDUCING MAGNETIC FIELD STRENGTHS IN WELDING ZONES

[76] Inventor: Philip J. Blakeley, 25 The Woodlands, Linton, Cambridge, England, CB1 6UG

[21] Appl. No.: 23,191

[22] Filed: Mar. 9, 1987

[30] Foreign Application Priority Data

Jun. 23, 1986 [GB] United Kingdom ............... 8615248

[51] Int. Cl.⁴ .............................................. B23K 9/08
[52] U.S. Cl. .................................. 219/123; 219/136
[58] Field of Search ................... 219/123, 124.34, 136

[56] References Cited

U.S. PATENT DOCUMENTS

| | | | |
|---|---|---|---|
| 3,150,624 | 9/1964 | Brems | 219/124.34 |
| 3,626,145 | 12/1971 | Jackson | 219/123 |
| 3,941,974 | 3/1976 | Kano et al. | 219/123 |

FOREIGN PATENT DOCUMENTS

| | | | |
|---|---|---|---|
| 656760 | 4/1976 | U.S.S.R. | 219/123 |
| 916169 | 4/1982 | U.S.S.R. | 219/123 |

Primary Examiner—Clifford C. Shaw
Attorney, Agent, or Firm—Hoffman & Baron

[57] ABSTRACT

Apparatus for reducing the strength of magnetic fields in a vicinity of weld zone in a workpiece to be welded includes a Hall effect sensor for sensing the strength of the resultant magnetic field in the weld zone vicinity, and a magnetic field generator responsive to the output signals from the Hall effect sensor to generate a counterbalancing magnetic field in the weld zone vicinity so as to reduce the resultant magnetic field in the weld zone vicinity.

14 Claims, 4 Drawing Sheets

METHOD AND APPARATUS FOR REDUCING MAGNETIC FIELD STRENGTHS IN WELDING ZONES

FIELD OF THE INVENTION

This invention relates to the counterbalancing of existing magnetic fields especially the automatic counterbalancing of remnant fields to aid welding, particularly arc and charged particle beam welding, of ferritic material.

Magnetism is experienced due to several factors including the presence of the earths field, magnetic particle inspection of materials, prior welding operations on the material and so forth. Even weak remnant fields in the ferritic material are in effect exaggerated in the weld zone by the V angle preparation normally employed. In fact any air gap in a magnetic steel circuit will register a higher field level than the surrounding air. The steel concentrates the field in the gap. In manual metal arc welding local fields of some 30 to 50 Oersteds (2.4 to 4.0 kA/m), can be tolerated by a skilled operator although it is desirable to reduce such fields to the order of 10 Oersteds and less. In extreme cases fields of several hundred Oersteds have been measured in the gap between two large steel components such as in joining long lengths of large diameter thick walled pipe together.

DESCRIPTION OF THE PRIOR ART

Several methods have been used to alleviate the magnetic field problem which gives rise to so called arc blow in arc welding. Firstly the bulk material can be completely demagnetised by subjecting it to strong fields of reversing polarity and reducing in strength. This procedure is continued until a very weak remnant field is experienced. Secondly the component can be passed through an A.C. excited coil to produce a surface skin of demagnetised material which acts as a magnetic shunt to the remaining bulk material. This latter method does not demagnetise the bulk material but produces a demagnetized layer on the outer surface so that externally no apparent field due to the material exists. However, in welding, if the outer layer is penetrated then the internal field is experienced yet again. Both these methods are essentially suitable for relatively small components only and for larger structures such as a bridge or an oil rig platform or in ship construction it is impracticable to employ such methods.

SUMMARY OF THE INVENTION

In accordance with one aspect of the present invention, apparatus for reducing the strength of magnetic fields in the vicinity of a weld zone in a workpiece to be welded comprises sensing means for sensing the strength of the resultant magnetic field in the weld zone vicinity; and magnetic field generating means responsive to the sensing means for generating a counterbalancing magnetic field in the weld zone vicinity whereby the resultant magnetic field in the vicinity of the weld zone is reduced.

The invention provides apparatus which can sense the strength of the resultant magnetic field only in the vicinity of the weld zone and automatically reduce the strength of magnetic fields in the vicinity of the weld zone thus avoiding problems of arc blow in subsequent arc welding. This reduction or elimination of magnetic fields also finds application in electron beam welding systems and other systems which utilise charged beams.

The counterbalancing field will remain in force during the welding process either at a constant level or varying with the position of welding.

In accordance with a second aspect of the present invention, a method of reducing the strength of magnetic fields in the vicinity of a weld zone in a workpiece to be welded comprises sensing the strength of the resultant magnetic field in the vicinity of the weld zone; and generating in response to the sensed field a counterbalancing magnetic field in the weld zone vicinity to reduce the resultant magnetic field in the vicinity of the weld zone.

In one mode of operation the strength of the resultant magnetic field in the weld zone vicinity is sensed at a plurality of positions along the weld zone, the counterbalancing magnetic field being adjusted in response to the sensed resultant magnetic field during a subsequent welding operation to generate a counterbalancing magnetic field to reduce the resultant magnetic field at the welding position. Typically the field will be sensed at a position upstream of the welding position during a welding process. This avoids problems of the welding equipment interfering with the sensing means. In one arrangement, the counterbalancing field is generated at the welding position in response to the field sensed at the upstream position. This is acceptable where the local magnetic field is substantially invarient (with a difference of $< \pm 20$ gauss) over a distance corresponding to the separation between the sensing means and magnetic field generating means. Alternatively the magnetic field values must differ by a known amount which could then be allowed for by the equipment controls. In another arrangement, the apparatus includes a store for storing information relating to the resultant magnetic field strengths at the plurality of positions along a region to be welded, the magnetic field generating means being responsive during a subsequent welding operation to the stored information to generate counterbalancing magnetic fields of suitable strengths when welding occurs at each of the sensed positions. This is suitable where the local magnetic fields are substantially time invarient. It should be noted that in some situations, including those just described, the sensing means may be physically separate from the magnetic field generating means. In this situation, the magnetic field generating means may be associated with arc welding apparatus and the sensing means may be scanned along a weld region prior to the welding operation.

The use of the apparatus in real time in which the counterbalancing field is automatically adjusted during welding has a major advantage that magnetic effects due to the arc are compensated for.

Where the apparatus is used in real time during welding, the sensing means can be used effectively as a null detector and the counterbalancing magnetic field can be generated such that the resultant magnetic field is low, for example less than 10 Oersteds. This is appropriate where the magnetic field in the welding region is sufficiently uniform or not varying markedly from point to point.

The apparatus may further include averaging means for averaging the resultant field strength sensed by the sensing means at a plurality of positions along the weld zone, the magnetic field generating means being responsive to the averaging means to generate a counterbalancing magnetic field which counterbalances the average sensed field. This will still leave some remnant fields of positive and negative polarity depending on whether the original field was greater or less than the average. However, so long as the fluctuation in field strength is less than say 20 Oersteds maximum to minimum, then with a mean counterbalancing field, remnant errors will not exceed nominally 10 Oersteds assuming an even distribution of high and low field strengths.

The store and/or averaging means may conveniently be provided by a micro-computer which controls operation of the magnetic field generating means.

It is possible for the original field to be reversed in polarity from point to point along the weld zone or seam. In this case a single counterbalancing field is less suitable since a counterbalancing field of one polarity will be effective in decreasing the original field strength of opposite polarity but enhancing original field strengths of the same polarity as the counterbalancing field. In such cases the components to be welded could be subjected to further treatment to ensure that the existing fields in the vicinity of the weld region are of single polarity, e.g. by providing a further exciting field coil to drive the ferritic material strongly with one polarity. On removing this extra driving field the remnant field should be still of one polarity but lower in magnitude as indicated by the remnant flux density of the magnetising hysteresis loop. This remnant field can then be automatically counterbalanced as previously described.

Alternatively, the apparatus may further comprise polarity sensing means for sensing the polarity of magnetic fields in the weld zone and for controlling the magnetic field generating means to generate a field with the opposite polarity.

The sensing means may comprise a Hall effect probe or sensor, a small sensing coil which may be vibrated or rotated to provide an EMF proportional to the local field in the vicinity of the sensing coil, or other conventional magnetic field sensor. In either case, conventional electronic circuitry may be provided to determine local magnetic field strengths. Preferably, the sensing means is protected from mechanical damage and the effects of local heat particularly that due to the arc and/or any pre-heat of the weld joint. The protection may be shaped to conform with the weld joint profile for purposes of suitable access.

The counterbalancing magnetic field generating means may comprise at least one electrical conductor which is positioned in use alongside the weld zone, and an electrical current generator connected to the electrical conductor to cause a current to flow through the conductor to generate the counterbalancing magnetic field. Examples include a coiled cable with a plurality of windings, a linear grouping of cables, or even a single cable connected to an electrical power source. The cables are preferably arranged so as to be substantially parallel to the weld zone, and so that if more than one cable is used, the current in each cable flows in the same direction. In particular, a coil may be provided which comprises a harness having a plurality of electrical wires terminating in respective connecting plugs such that when the plugs are connected together, the wires of the harness define a continuous coil.

Preferably, the counterbalancing magnetic field generating means is powered with direct current of suitable polarity. The direct current can be derived from the normal mains supply with for example phase control of a thyristor bridge to regulate the current level. Alternatively, a controllable source of direct current can be used such as a DC welding generator with field control of the current level. As a further alternative, a standard transformer rectifier with transductor control, or transistor regulator equipment including inverter systems operating direct from the main supply can be used.

It is possible to incorporate the demagnetising power supply into a welding set. This could be achieved by adding the appropriate control electronics to a welding supply. Alternatively a power unit could be designed to be a demagnetiser or a welding set. Alternatively a power unit could be designed to provide a welding current and a demagnetising current simultaneously.

It should be understood that by "workpiece" we include two or more components which are to be welded together or a single component in which a repair weld is to be made. Also, the term "weld zone" includes an entire region to be welded and also part of such a region.

BRIEF DESCRIPTION OF THE DRAWINGS

An example of apparatus according to the invention will now be described with reference to the accompanying drawings, in which.

DETAILED DESCRIPTION OF AN EMBODIMENT

Figure 1:
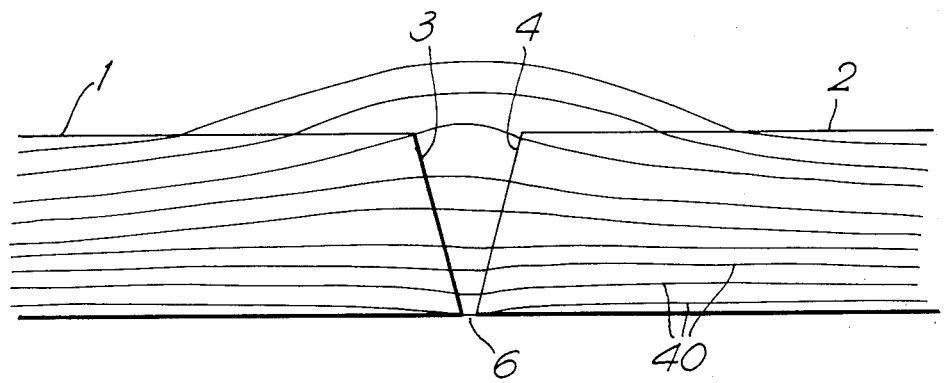
FIG. 1 illustrates the distribution of magnetic flux in a V preparation.

FIG. 1 illustrates two ferritic steel components 1, 2 having butting faces 3, 4 defining a V joint which is to be welded. Typically, the components 1, 2 are defined by two plates to be welded. The drawing also illustrates the lines 40 of magnetic flux caused by local magnetic affects and by the earth's magnetic field. It will be seen that these lines 40 are concentrated at the narrow portion of the V joint and this contributes to causing an arc of arc welding apparatus to deflect.

Figure 2:
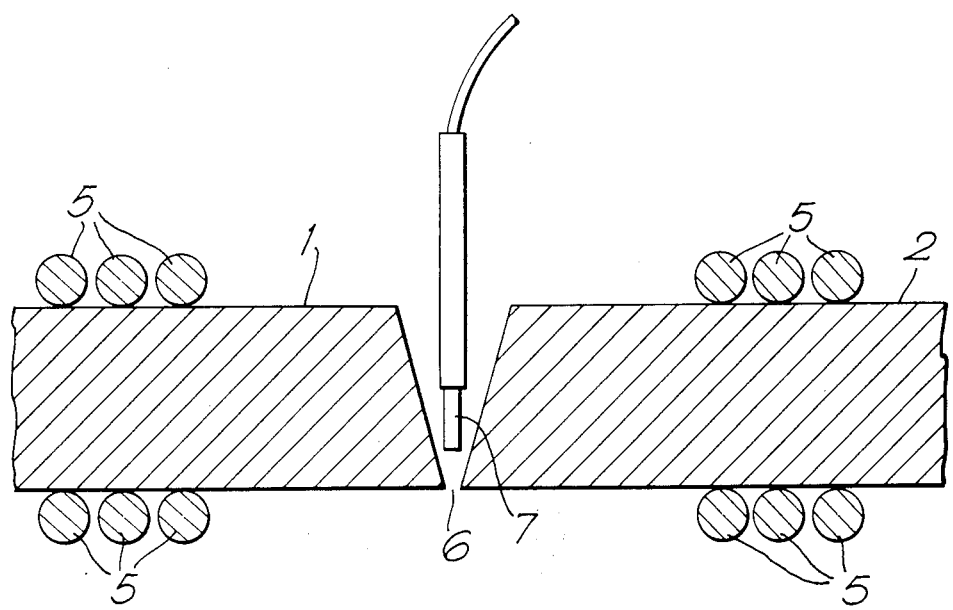
FIG. 2 illustrates schematically part of the apparatus associated with the workpiece of FIG. 1.

FIG. 2 illustrates how the invention provides in this example a way of counterbalancing this magnetic field by positioning an electrical coil 5 around the components 1, 2 on either side of the weld joint 6.

The apparatus also includes a Hall effect sensor 7 which is responsive to the local magnetic fields.

The counterbalance field coil 5 can be applied on one side of the welding joint or preferably (as shown) distributed on both sides of the welding joint as for example in joining two plates together where there is access to the rear of the plates.

Figure 3:
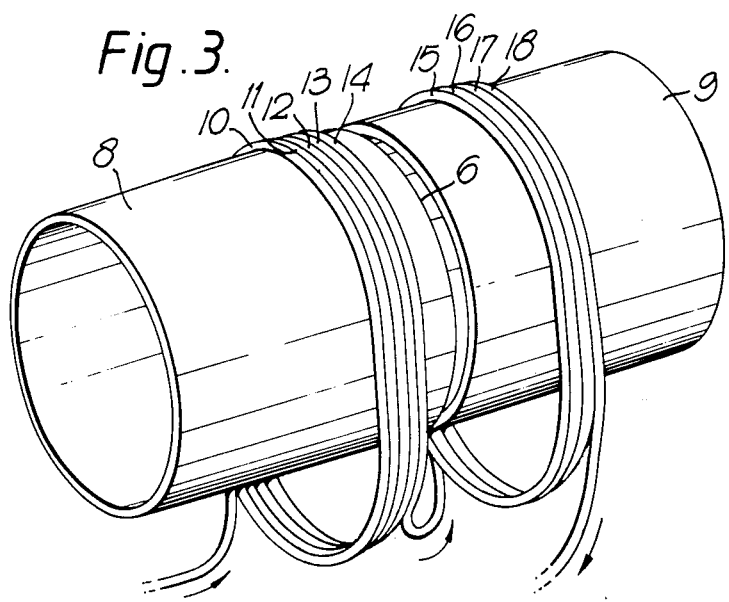
FIG. 3 illustrates schematically the arrangement of part of the apparatus for a circular joint.
Figure 4:
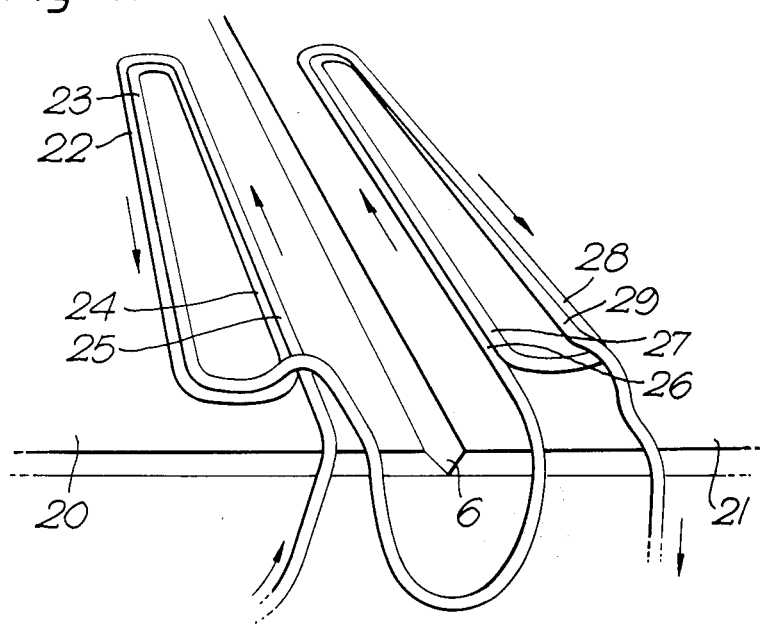
FIG. 4 illustrates schematically the arrangement of part of the apparatus for a linear joint.

Examples of how the coil 5 may be arranged in practice are shown in FIGS. 3 and 4. FIG. 3 illustrates two circular ferritic steel pipes 8, 9 and the positioning of the coil 5 around the pipes 8, 9. Loops 10, 11, 12, 13, 14 are placed adjacent to the weld joint 6 on pipe 8 while loops 15, 16, 17, 18 are placed adjacent to the weld joint 6 on pipe 9. The loops 10-18 are arranged so that the current flows in the same direction through each loop relative to the pipes 8, 9, and so that the loops lie substantially parallel to each other and the weld joint 6.

FIG. 4 illustrates two ferritic steel plates 20, 21 and the positioning of the counterbalancing coil 5 on the surface of the plates 20, 21. This is particularly useful in applications where there is no rear access. The coil 5 is divided into two pairs of loops positioned on opposite sides of the weld joint 6. The loops of one pair are formed from elongate sections 22–25 with the sections being connected in series in the order 23, 24, 22, 25. The loops of the other pair are formed from elongate sections 26–29 with the sections being connected in series in the order 26,28,27,29. Section 23 is connected in series with section 26. Sections 22–25 are arranged on plate 20 and sections 26–29 are arranged on plate 21. They are arranged in such a manner that sections 24, 25, 26, 27 are substantially parallel to each other and to the weld joint 6, and so that sections 24–27 are closer to the weld joint than sections 22, 23, 28, 29. In addition, the sections 22–29 are arranged so that the current in the sections 24–27 flows in the same direction.

For convenience the counterbalancing coil 5 may be in the form of a belt or harness which when the two free ends are plugged together result in a continuous current path from one end of the coil to the other, see FIG. 2. The coil may comprise heavy current cables and only a limited number of turns or lighter current wires and greatly increased number of turns to give the desired total ampere-turn product. For many practical applications a maximum of 500 ampere-turns is sufficient. A multi-turn coil in the form of a harness with suitable connecting plug can for example be one meter long for use on pipes up to 300 mm. diameter and 2 meter long for pipes up to 600 mm. diameter and so forth. For flat plates the harness can be any length, and if this is less than twice the length of the seam to be joined, the harness can be used to demagnetise one section of the joint at a time. Preferably, however, the length of the harness should be at least 100 mm. greater than twice the length of the plate along the seam to be joined.

Figure 5:
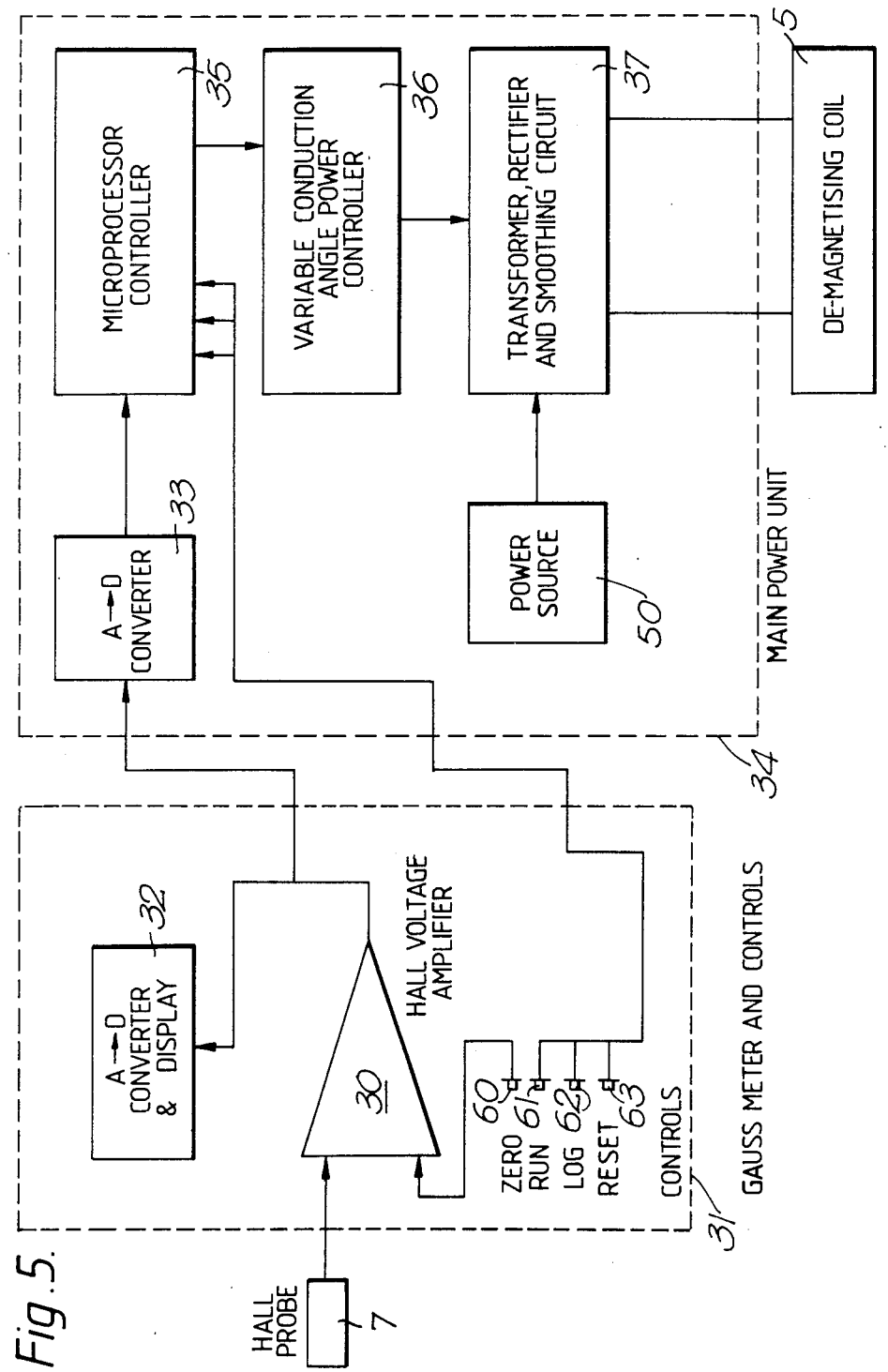
FIG. 5 is a block diagram of the apparatus.
Figure 6A:
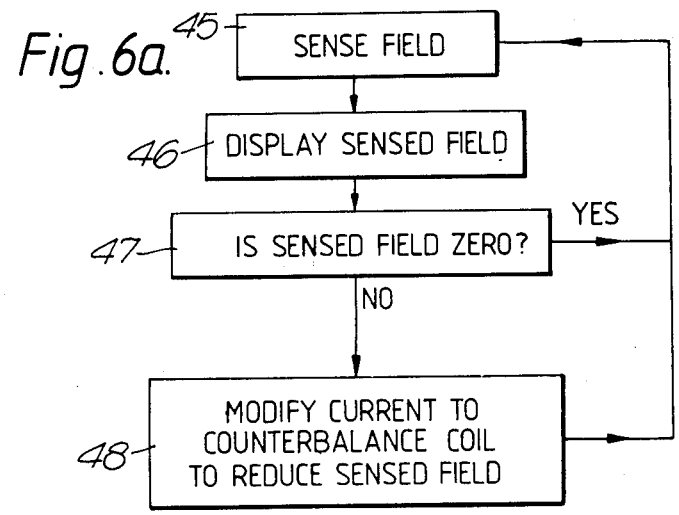
FIGS. 6a and 6b are flow diagrams illustrating two modes of operation.

In one mode of operation (FIG. 6a) in which the counterbalancing field generated by the coil 5 is adjusted in real time during welding, the sensor 7 is held away from magnetic materials and the zero button 60 is pressed to set the zero Gauss reference level. The sensor 7 is then placed in the weld joint 6 and the run button 61 is pressed. The sensor 7 generates an electrical output voltage which is proportional to the strength of the local magnetic field detected in the weld joint 6 (step 45). This is then fed to an amplifier 30 (FIG. 5) within a Gauss meter and control box 31, where the input signal is compared with a zero reference. The resultant signal representative of the magnetic field is then shown on a display 32 (step 46). The output of the amplifier 30 is also connected to an Analogue to Digital converter 33, housed in a main power unit 34, in order that a microprocessor controller 35 can determine the magnitude and direction of the magnetic field in the joint 6.

If the resultant sensed field is not zero (step 47), the microprocessor controller 35 adjusts the conduction angle of a variable conduction angle power controller 36 until the current passing through the counterbalance coil 5 has produced a magnetic field such that the magnetic field strength measured by the sensor 7 is substantially zero (step 48).

A power source 50 generates current and supplies it to a transformer, rectifier and smoothing circuitry 37 which is designed to produce smooth direct currents in a range that requires only a few turns of cable to be placed around the workpiece to form the demagnetising coil 5. Thus for continuous counterbalancing the exciting counterbalance field current is regulated such that the remnant field in the vicinity of the weld joint 6 is reduced to a low value. The process is stopped by pressing the reset button 63 which leaves the unit ready to start again.

Figure 6B:
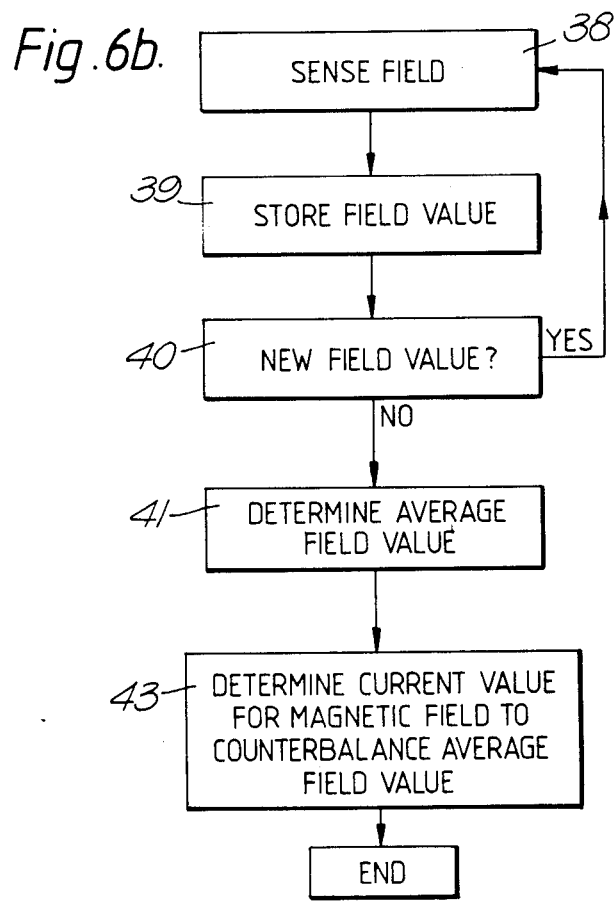

Alternatively, in another mode of operation, depicted by a flow diagram in FIG. 6b the sensor 7 is again held away from magnetic materials and the zero button 60 pressed to set the zero Gauss reference level. The log button 62 is then pressed and the sensor 7 is then passed along the weld joint 6 with its output signals being sampled (step 38) and stored (step 39) by the microcomputer so that the microcomputer can determine the average local magnetic field (step 41). By pressing the run button 61 the microcomputer then adjusts the field generated by the counterbalance coil 5 to be equal and opposite to the average field (step 42). The process is stopped by pressing the reset button 63 which leaves the unit ready to start again.

The sensor 7 can conveniently be mounted on a carriage which moves along the joint 6 to be welded. The carriage may be driven at a fixed speed similar to the normal welding speed or alternatively may be attached to the welding head so that it remains at a fixed distance ahead of the welding system. Alternatively where the field information is stored in the micro-computer 35 the carriage may be moved in any convenient manner along the joint 6 with combined registration of distance and field strength. This information may be played back for point by point correction of the magnetic field or may be further averaged and a steady counterbalance field applied (as described above).

Preferably the height of the sensor 7 with respect to the work surface is adjustable so that the sensor 7 is sensing in the region which will be filled by the weld metal. Thus the sensor 7 may be set at a height above the original joint profile or at a suitable height above a previous weld pass in multi-pass welding where the sensor is typically between 1 and 5 mm. above the previous metal surface. Alternatively the sensor may be mounted on a sprung support arm such that it rides just above the metal surface concerned at a suitable height.

I claim:

1. Apparatus for reducing the strength of magnetic fields in the vicinity of a weld zone in a workpiece to be welded, the apparatus comprising sensing means for sensing the strength of a resultant magnetic field in said weld zone vicinity, and magnetic field generating means responsive to said sensing means for generating a counterbalancing magnetic field in said weld zone vicinity between pole pieces defined by the workpiece whereby said resultant magnetic field in said vicinity of the weld zone is reduced.

2. Apparatus according to claim 1, wherein said sensing means generates an output signal related to said resultant magnetic field in said weld zone vicinity, said magnetic field generating means being responsive to said output signal from said sensing means to generate a counterbalancing field which maintains said sensing means output signal at a substantially constant level corresponding to a minimum resultant magnetic field in said vicinity of the weld zone.

3. Apparatus according to claim 1, including averaging means for averaging the resultant field strength sensed by said sensing means at a plurality of positions along said weld zone, said magnetic field generating means being responsive to said averaging means to generate a counterbalancing magnetic field which counterbalances said average sensed field.

4. Apparatus according to claim 1, wherein said sensing means comprises a Hall effect sensor.

5. Apparatus according to claim 1, wherein said counterbalancing magnetic field generating means comprises at least one electrical conductor which is positioned in use alongside said weld zone, and an electrical current generator connected to said electrical conductor to cause a current to flow through said conductor to generate the counterbalancing magnetic field.

6. A method of reducing the strength of magnetic fields in the vicinity of a weld zone in a workpiece to be welded, the method comprising sensing the strength of a resultant magnetic field in said vicinity of the weld zone; and generating in response to said sensed field a counterbalancing magnetic field in said weld zone vicinity between pole pieces defined by the workpiece to reduce said resultant magnetic field in said vicinity of the weld zone.

7. A method according to claim 6, wherein the strength of said resultant magnetic field in said weld zone vicinity is sensed at a plurality of positions along the weld zone said sensed resultant magnetic field strengths being stored, and said counterbalancing magnetic field being adjusted in response to said stored resultant magnetic field strengths during a welding operation to reduce the resultant magnetic field at the welding position.

8. A method according to claim 6, wherein the strength of the resultant magnetic field in said vicinity of the weld zone is sensed at a plurality of positions along said weld zone, the method further comprising determining the average resultant magnetic field, and generating a counterbalancing magnetic field with substantially the same magnitude but opposite polarity to the sensed average field throughout the weld zone.

9. A method according to claim 6, wherein said counterbalancing magnetic field reduces said resultant magnetic field in said vicinity of the weld zone to substantially zero.

10. In a method of welding a workpiece defining weld zone in which the position of welding is caused to move along said weld zone of said workpiece, characterized in that the method comprises continually sensing the strength of a resultant magnetic field in the vicinity of said weld zone at positions spaced by a substantially constant distance upstream of said welding position; and generating in response to said sensed magnetic field a counterbalancing magnetic field between pole pieces defined by the workpiece which reduces the strength of said resultant magnetic field at the welding position.

11. A method according to claim 10, wherein said counterbalancing magnetic field is generated to substantially completely cancel the resultant magnetic field at the sensing position.

12. A method according to claim 10, further comprising storing said sensed resultant magnetic fields; and as said welding position coincides with a sensing position, generating said counterbalancing magnetic field in accordance with the stored field for that position.

13. Apparatus for reducing the strength of magnetic fields in the vicinity of a weld zone in a workpiece to be welded, the apparatus comprising sensing means for sensing the strength of a resultant magnetic field in said weld zone vicinity, and magnetic field generating means responsive to said sensing means for generating a counterbalancing magnetic field in said weld zone vicinity whereby said resultant magnetic field in said vicinity of the weld zone is reduced, averaging means for averaging the resultant field strength sensed by said sensing means at a plurality of divisions along said weld zone, and said magnetic field generating means being responsive to said averaging means to generate a counterbalancing magnetic field which counterbalances said average sensed field.

14. A method of reducing the strength of magnetic fields in the vicinity of a weld zone in a workpiece to be welded, the method comprising sensing the strength of a resultant magnetic field in said vicinity of the weld zone; and generating in response to said field a counterbalancing magnetic field in said weld zone vicinity to reduce the said magnetic field in said vicinity of the weld zone, the strength of the resultant magnetic field in said vicinity of the weld zone is sensed at a plurality of positions along said weld zone, the method further comprising determining the average resultant magnetic field, and generating a counterbalancing magnetic field with substantially the same magnitude but opposite polarity to the sensed average field throughout the weld zone.

* * * * *